Aug. 8, 1933.　　　　　R. KELLER　　　　　1,921,677

PARALLELING SYSTEM FOR ALTERNATING CURRENT GENERATORS

Filed Oct. 29, 1929

Inventor
Robert Keller
By (signature)
Attorney

Patented Aug. 8, 1933

1,921,677

UNITED STATES PATENT OFFICE 1,921,677

PARALLELING SYSTEM FOR ALTERNATING CURRENT GENERATORS

Robert Keller, Ennetbaden, Switzerland, assignor to Aktiengesellschaft Brown Boveri & Cie., Baden, Switzerland, a joint stock Company of Switzerland Application October 29, 1929, Serial No. 403,173, and in Germany November 9, 1928

3 Claims. (Cl. 171—118)

This invention relates to improvements in systems for synchronizing an alternating current source or generator with another source of alternating current in preparation for parallel connection thereto.

The use of motors capable of operation in both directions is well known in synchronizing systems. Such motors turn in one direction or the other as long as the frequency of the generator connected to one circuit thereof is greater than the frequency of the alternating current source connected to the other circuit thereof. It has been found necessary, however, heretofore, to provide a motor of relatively large size, and to supply the rotors and the stators of such motors with multi-phase to obtain proper action thereof.

One object of the invention is to utilize a motor rotatable in both directions to operate on the speed regulator of an alternating current generator to be connected in parallel with another source of alternating current without supplying such motor with multi-phase current.

Figure 1:
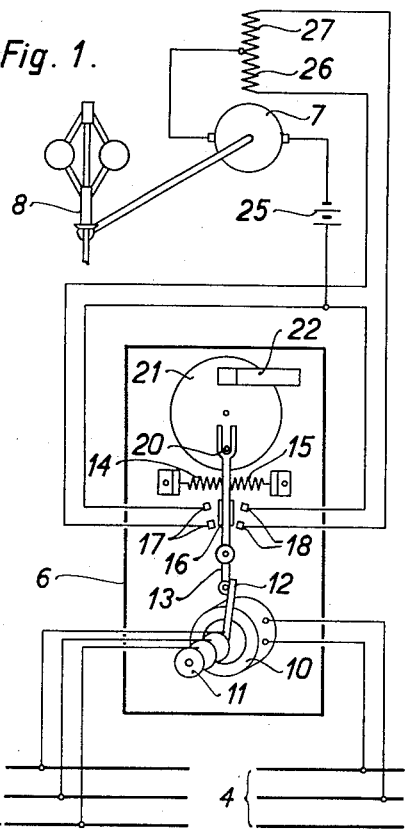
Figure 2:
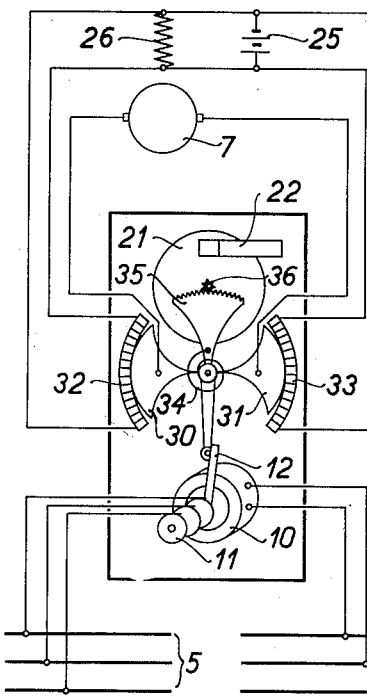
Figure 3:
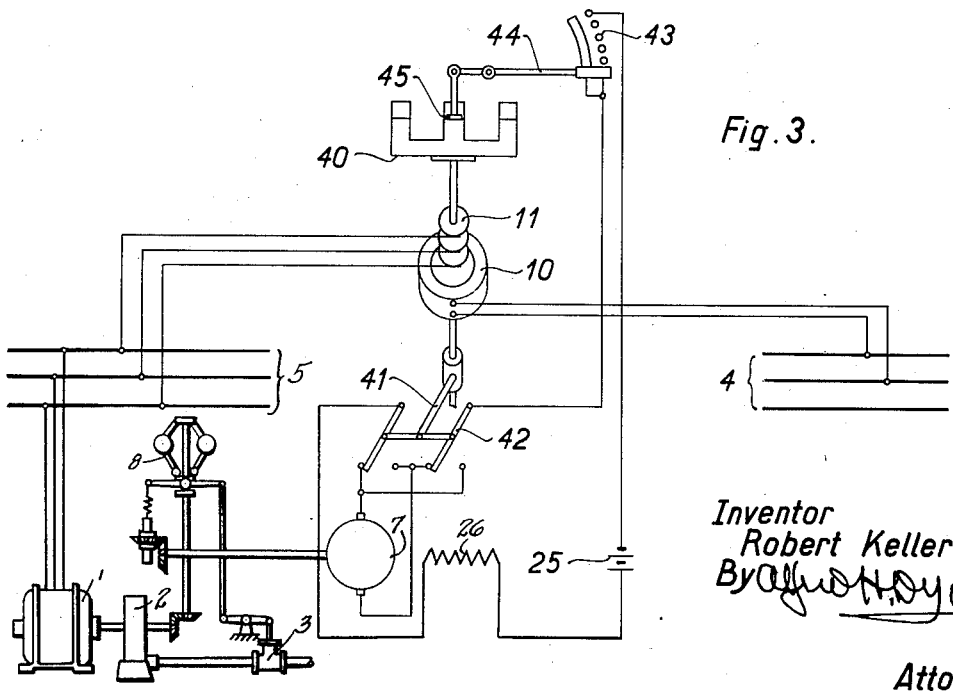

Other objects and advantages will be apparent from the following description and the drawing, in which, Figure 1 is an illustration, partially shown in diagram, of one embodiment of the present invention, Fig. 2 is a modified form, again partially shown in diagram, of the embodiment of the present invention as shown in Fig. 1; and Fig. 3 is a modification of a synchronizing system, according to the present invention.

Referring more particularly to the drawing by characters of reference, the reference numeral 4 indicates the conductors of a three phase alternating current circuit supplied from a source of current (not shown) to be connected with conductors 5 of a second three phase alternating current circuit connected with a source of current, indicated in Fig. 3 of the drawing as an alternating current generator 1, driven by a prime mover 2, of any well known desirable type when supplied with a suitable operating fluid through a conduit provided with a suitable throttle valve 3. The reference numeral 6 indicates a means for synchronizing the two sources of alternating current 4 and 5. The synchronizing device 6 is adapted to control the direction of rotation of a motor, the armature of which is indicated at 7, which motor is connected with the speed regulator, indicated at 8, operated by the prime mover 2 for actuating the throttle valve 3.

The synchronizing device 6, as shown in Fig. 1, comprises a synchroscope, the stator 10 of which is supplied with single phase current from the source of alternating current connected with the conductors 4, and the rotor 11 of the synchroscope is supplied with multi-phase current from the source 3 which is to be synchronized and connected in parallel with the source connected with conductors 4. The rotor 11 of the synchroscope carries a lever member 12 arranged in such manner as to be rotatable therewith. The rotatable lever 12 is arranged to contact with one end of a pivotally mounted lever 13 which is normally maintained in the central position by springs 14, 15 and is provided with a contacting member 16 for the purpose of bridging the pairs of contacts 17 or 18 in either its extreme right or left position. The one end of the lever 13 is slotted to receive a pin 20 secured to a metallic disk 21 which is rotatably mounted between the poles of a magnet 22 for a purpose which will appear hereinafter. The pairs of contact 17 and 18 control the supply of current from a source 25 to the armature 7 and the double fields 26, 27 of the motor controlling the speed regulator 8.

Assuming that current source 3 connected with conductors 5 is to be synchronized and connected in parallel with current source connected with and supplying conductors 4, the action of the two sources of current on the synchroscope 10, 11 will be such as to determine the direction and amount of movement thereof in dependence on the controlling frequency and the difference of the frequency between the two sources. Movement of the rotor 11 of the synchroscope causes movement of the lever 12 in one direction or the other, and lever 12 contacts with the pivoted lever 13 causing the lever 13, to swing to the right or left against the action of the springs 14, 15. Assuming that the rotor 11 of the synchroscope is moving in a counterclockwise direction, the lever 13 will be moved toward the right until the contact member 16 thereof bridges the contacts 18, whereupon a circuit will be completed through the source of current 25, the armature 7 and the field 27 of the motor, whereupon the armature will rotate in one direction and cause corresponding operation of the speed regulator 8 controlling the current source 3. If such action of the speed regulator 8 is considered as increasing the phase difference of the source 3 over that of the source supplying conductors 4; a reverse action of the synchroscope will take place, that is, the rotor 11 thereof will move in a clockwise direction, thereby releasing lever 13, which is returned to the central position through the action of springs 14, 15 until continued clockwise movement of the synchroscope rotor 11 causes lever 12 to come into contact with the lever 13 so that the lever 13 is shifted toward the left, thereby closing contacts 17, by means of contact member 16, and completing a circuit through the source of current 25, the armature 7 and the field 26 of the motor. The motor will now operate in a direction opposite to that above indicated, and will cause corresponding movement of the regulator 8 which thereupon decreases the frequency of the source 3. It will be understood that the above described action of the synchronizing device will cause an oscillating action of the source 5 which may, when the lines approach synchronization, become more rapid than is desirable. In such case the inter-action of pin 20 with the slotted end of the lever 13 will retard the movement of the lever, due to the damping action of the magnet 22 on the magnetic disk 21. Such damping action provides a short interval of time during which the speed regulator 8 and the source of current 3 connected therewith may adjust themselves in preparation for the reverse action.

In the modified embodiment of the invention shown in Fig. 2, the synchronizing device 6 includes the synchroscope 10, 11 above referred to which operates in connection with a voltage regulator, of the general character described in U. S. Patent #1,003,600, to H. Guttinger, comprising a pair of sectors 30, 31 operating over a pair of resistances 32, 33 and normally maintained in the zero position by a spring 34. The sectors 30, 31 are connected with a toothed sector 35 which engages a pinion 36 mounted on the metallic disk 21 in place of the pin 20 as above described. In the present embodiment the motor 7 is provided with only the single field winding 26.

The field 26 of the motor, being connected across the source of current 25, is supplied at a constant voltage therefrom, and the armature 7, being connected to the sectors 30, 31, is likewise supplied at a constant voltage. Rotation of the rotor 11 of the synchroscope in either direction causes a displacement of the points of contact of sectors 30, 31, with resistances 32, 33, thereby applying a voltage of suitable polarity to the armature 7 of the motor so as to obtain the desired operation of such motor, which acts upon the speed regulator of the source 5, as above described. The actions of disk 21 and magnet 22 in the present synchronizing device are similar to that above described with respect to Fig. 1, but it will be understood that the changes will not be so rapid as above described, due to the gradual application of voltage on the motor armature by the voltage regulator.

In the modified form of the invention shown in Fig. 3, the synchroscope 10, 11 has connected to the rotor 11 thereof a vessel 40 filled with a fluid of suitable viscosity. The shaft at the opposite end of the rotor 11 is provided with a lever 41 having a rotating fit thereon to operate in the manner of a friction clutch. The lever 41 is pivotally connected with a double pole, double throw switch 42 which controls a circuit including the field 26 of the motor and the motor armature 7, the source of current 25, and a resistance 43. More or less of the resistance 43 is placed in the circuit by a resistance arm 44 which is connected with a float member 45 resting on the surface of the fluid within the central chamber of the vessel 40. The levels of the fluid within the chambers of the vessel 40 are determined by the speed at which such vessel is rotated by the rotor 11 of the synchroscope, centrifugal force operating to force part of the liquid into the end chambers of the vessel. The speed of the motor 7 is accordingly controlled directly by the speed of the synchroscope 10, 11 due to the fact that more or less of the resistance 43 is placed in circuit with the motor in direct relation to the speed of the synchroscope, which itself rotates in direct dependence on the frequency difference of the two sources to be connected in parallel. The direction of rotation of the synchroscope rotor 11 controls the direction of the flow of current through the motor circuits by causing a reversal of lever 41 and switch 42 so that the speed-changing motor is reversed in direct dependence on the direction of rotation of the synchroscope. It will be apparent that the structure described above causes a continuous regulation of the speed of the motor controlling the speed regulator of the source to be connected.

The several modified embodiments of the present invention accordingly provide a synchronizing system in which the speed of the motor controlling the regulator of the source of alternating current to be connected is operated in a rapid thrust-like manner by one of the embodiments of the invention, and is operated in a less rapid thrust-like manner by another embodiment of the invention, and is operated continuously by a further modification of the invention. The choice of the modification of the present invention to be used in each case will be determined by conditions in the circuits to be connected in parallel and the characteristics of the generators, as will be well understood.

Although but three embodiments of this invention have been illustrated and described, it will be understood that various other embodiments are possible, and that various changes may be made without departing from the spirit of the invention or the scope of the appended claims.

The invention claimed is:

1. In a system for synchronizing two polyphase alternating current circuits, a servo-motor for controlling conditions of frequency in one of said circuits, a device operative to either of two positions for effecting forward or reverse operation of said servo-motor, a synchroscope for operating said device to said positions comprising a shaft, a polyphase wound rotor mounted on said shaft for rotation in either direction, and a single-phase wound stator, said rotor and stator connected respectively to said circuits, a clutch device providing a frictional connection between said rotor shaft and said device, a resistance in circuit with said servo-motor, and a fluid actuated device centrifugally operated by the rotation of said synchroscope to vary said resistance to control the speed of said servo-motor.

2. A synchronizing device comprising, an electric motor, a device for effecting operation of said motor in either direction, a synchroscope for operating said device comprising a polyphase wound rotor and a single-phase wound stator, said rotor being supported for rotation in either direction, and means providing an intermittent connection between said rotor and said device to periodically operate said device in one sense upon rotation of said rotor in one direction and to periodically operate said device in the opposite sense upon rotation of said rotor in the opposite direction, said device comprising a pair of resistors and sectors complementary thereto and having rolling contact therewith.

3. In a system for synchronizing two alternating current circuits, a motor controlling conditions of frequency in one of said circuits, a synchroscope having a stator connected with one of said circuits and a rotor connected with the other of said circuits for rotation in one and another direction as determined by the frequency condition of the said other of said circuits with relation to the frequency condition of the said one of said circuits for causing forward and reverse movements of said motor in dependence upon the direction of movement of said rotor, and means controlled by said rotor operable to cause the rate of movement of said motor to vary in dependence upon the extent of movement of said rotor.

ROBERT KELLER.